United States Patent
Hamilton

(10) Patent No.: US 10,426,282 B1
(45) Date of Patent: Oct. 1, 2019

(54) PERSONAL FOLDABLE SERVER TRAY APPARATUS

(71) Applicant: Margaret Hamilton, Chicago, IL (US)

(72) Inventor: Margaret Hamilton, Chicago, IL (US)

( * ) Notice: Subject to any disclaimer, the term of this patent is extended or adjusted under 35 U.S.C. 154(b) by 0 days.

(21) Appl. No.: 16/288,320

(22) Filed: Feb. 28, 2019

Related U.S. Application Data

(60) Provisional application No. 62/645,262, filed on Mar. 20, 2018.

(51) Int. Cl.
*A47G 23/06* (2006.01)
*G01S 13/08* (2006.01)

(52) U.S. Cl.
CPC ......... *A47G 23/06* (2013.01); *A47G 23/0625* (2013.01); *A47G 23/0633* (2013.01); *G01S 13/08* (2013.01); *G01S 2205/007* (2013.01)

(58) Field of Classification Search
CPC ................ A47G 23/06; A47G 23/0625; A47G 23/0633; B65D 1/34; B65D 7/08; G01S 13/08; G01S 2205/007
USPC .................................. 294/144, 172; 206/557
See application file for complete search history.

(56) References Cited

U.S. PATENT DOCUMENTS

| | | | |
|---|---|---|---|
| 4,227,467 A | 10/1980 | Kindsfather | |
| D290,919 S | 7/1987 | Beute | |
| 5,114,038 A | 5/1992 | Laumann | |
| 5,437,493 A * | 8/1995 | Weisleder | B62B 9/26 297/150 |
| D395,797 S | 7/1998 | Sirlin | |
| 6,732,990 B2 | 5/2004 | Hudson | |
| 7,000,799 B1 | 2/2006 | Hamre | |
| 7,232,055 B1 | 6/2007 | Lim | |
| 7,542,910 B2 | 6/2009 | Kellough | |
| 7,559,430 B2 * | 7/2009 | D'Olimpio | B65D 7/08 220/6 |
| 7,565,997 B1 | 7/2009 | Lim | |
| D601,853 S | 10/2009 | Tzilvelis | |
| 8,331,877 B1 * | 12/2012 | Wilkinson | A47G 23/0625 206/557 |
| 8,463,765 B2 | 6/2013 | Lesavich | |
| 8,505,768 B2 * | 8/2013 | Bardwell | A45C 11/20 206/564 |
| 8,904,943 B2 | 12/2014 | Jin | |
| 9,037,654 B2 | 5/2015 | Lesavich et al. | |
| 9,137,250 B2 | 9/2015 | Lesavich et al. | |
| 9,361,479 B2 | 6/2016 | Lesavich et al. | |
| 9,380,863 B2 | 7/2016 | Sakanoue | |

(Continued)

*Primary Examiner* — Dean J Kramer
(74) *Attorney, Agent, or Firm* — Lesavich High-Tech Law Group, S.C.; Stephen Lesavich

(57) ABSTRACT

A personal foldable serving tray apparatus that is foldable/un-foldable. In a closed, folded configuration, the foldable serving tray comprises a specific size and shape to fit into a pocket of a serving coat, vest, or apron of waiter, waitress, bartender or other servers. In an open, unfolded configuration, the personal foldable serving tray is used as a flat surface to serve food or drinks. The personal foldable serving tray apparatus includes a wireless electronic location component that allows physical location of the apparatus to be tracked within a physical space such as a restaurant, bar, etc. and displayed on a map and can also be used to measure productivity of waiters using the apparatus and accept secure wireless electronic payments from customers directly on the apparatus.

20 Claims, 8 Drawing Sheets

SIDE PERSPECTIVE VIEW

(56) References Cited

U.S. PATENT DOCUMENTS

| | | |
|---|---|---|
| 9,504,314 B2 | 11/2016 | Leng |
| 9,569,771 B2 | 2/2017 | Lesavich et al. |
| 9,795,236 B2 | 10/2017 | Smallman |
| 2004/0084463 A1 | 5/2004 | Belasalma |
| 2007/0164579 A1 | 7/2007 | Pike |
| 2011/0208710 A1 | 8/2011 | Lesavich |
| 2012/0097574 A1 | 4/2012 | Parsons |
| 2012/0278622 A1 | 11/2012 | Lesavich et al. |
| 2013/0057005 A1 | 3/2013 | Grieve |
| 2014/0189792 A1 | 7/2014 | Lesavich et al. |
| 2015/0379301 A1 | 12/2015 | Lesavich et al. |
| 2016/0066727 A1 | 3/2016 | Koufos |
| 2016/0121772 A1 | 5/2016 | Stecko |
| 2016/0321654 A1 | 11/2016 | Lesavich et al. |
| 2017/0086603 A1 | 3/2017 | Sortino |
| 2017/0188697 A1 | 7/2017 | Lin |
| 2017/0224143 A1* | 8/2017 | Daley ................ A47G 23/0625 |
| 2017/0251807 A1 | 9/2017 | Haskins |
| 2017/0265632 A1* | 9/2017 | Johnson ................ A45F 3/005 |
| 2018/0127151 A1 | 5/2018 | Pantelleria |

* cited by examiner

TOP VIEW

BOTTOM VIEW

SIDE PERSPECTIVE VIEW

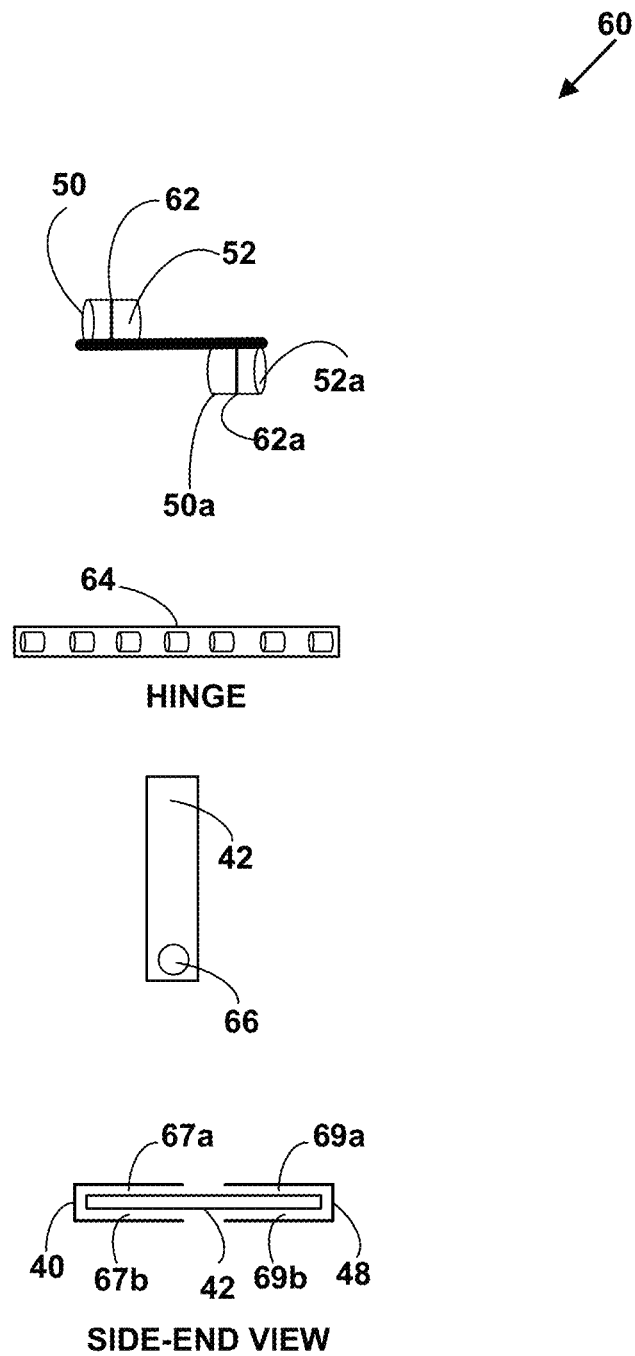

FOLDED TOP
VIEW

FIG. 6
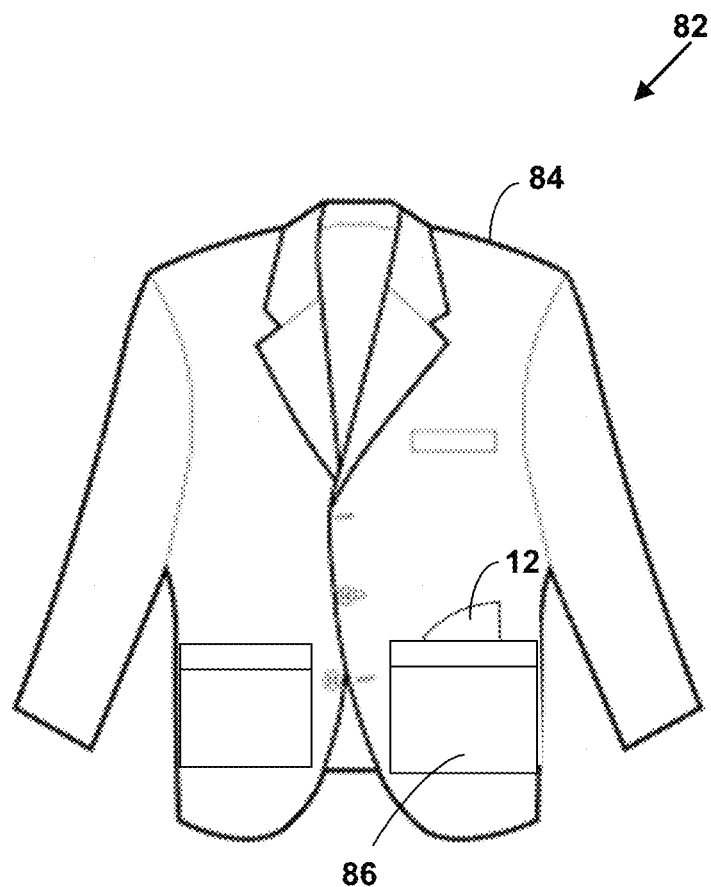
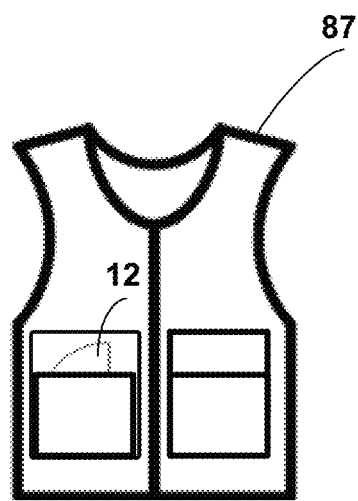

PERSONAL FOLDABLE SERVER TRAY APPARATUS

CROSS REFERENCES TO RELATED APPLICATIONS

This U.S. Utility patent application claims priority to U.S. Provisional patent application No. 62/645,262, filed on Mar. 20, 2018, the contents of which is incorporated by reference.

FIELD OF INVENTION

This application relates to serving trays. More specifically, it relates to a personal foldable server tray apparatus.

BACKGROUND OF THE INVENTION

Serving trays are used in most restaurants, bars and taverns. In many restaurant, bars and taverns there are few serving trays used by all servers and bartenders.

There are many problems with such serving trays. One problem is that when one server or bartender needs a serving tray to serve food or drinks, all the serving trays are being used by other servers and bartenders. Another problem is that the serving trays are large and cumbersome to use. Another problem is that the serving trays are expensive so an establishment will only purchase a few serving trays to be used by all servers and bartenders.

There have been attempts to solve some of the problems associated with serving trays.

For example, U.S. Pat. No. 7,559,430, issued to D'Olimpio teaches "A collapsible serving tray that is stiff and flat when open and reduced in size and compact when folded. The tray is designed to be folded up into a compact size that is about one-quarter of the fully deployed size of the tray. One embodiment of the tray includes a perimeter edge that is ninety degrees to the flat serving surface when the tray is fully deployed."

U.S. Pat. No. 7,542,910, issued to Kellough teaches "A food and drinks serving tray is created to include two separate areas for drinks and glassware. The separate areas are formed by an outer rim and inner rim which partially or fully prevents spillage on or off of the tray. The food and drinks serving tray includes a billfold drawer and a coin reservoir to collect and conceal a waitress' cash payment for the orders she takes. A handle can be added to the underside of the tray for easy tray handling. The food and drinks serving tray can be manufactured of different materials and have different shades of color. In addition, the food and drinks serving tray has a flat base surface which can be manufactured to come in different shapes such as a circle or rectangle."

U.S. Pat. No. 8,904,943, issued to Jin teaches "A foldable table may include a table top and legs that are movable between an extended position and a collapsed position. The table top may include a first section and a second section that are connected by a hinge assembly. A locking member may be sized and configured to lock the hinge assembly in a fixed position. Advantageously, moving the legs between the extended and collapsed positions may cause the locking mechanism to move between the locked and unlocked positions. Thus, when the legs are in the extended position and the locking mechanism is in the locked position, the table top may be secured in the unfolded position."

There have been some attempts to use folding tables as serving trays by removing the legs of the table.

However, such attempts have not worked well. For example, U.S. Pat. No. 9,504,314, issued to Leng teaches "Disclosed is a folding table including two table tops, a first and second support components and four table legs. The two table tops are joined at a folding line with a middle point. The support components support the table tops, each of which has a border and two connecting arms. The border is connected to an outer edge of the table tops. One end of the connecting arm is connected to the border, and the other end of the connecting arm has a hinge part. The hinge part of the connecting arm of the first support component joins that of the respective connecting arm of the second support component. One end of the table leg is hinged to the border. The other ends of the table legs meet at the middle point in the folded state."

U.S. Pat. No. 9,380,863, issued to Sakanoue teaches "A folding table includes: a table body provided with a pair of hinge pins and a pair of lock pins, each of the pairs protruding oppositely in left-right direction; and a pair of left and right brackets having shaft holes in which the hinge pins are inserted and movable holes in which the lock pins are inserted. Spring members mounted in the movable holes press the lock pins. The table body is rotatably supported by the brackets affixed to a wall surface. The folding table has closing plates having through-holes respectively through which the hinge pins and the lock pins are penetrated. The closing plates are sandwiched between the table body and the brackets to close the movable holes."

U.S. Design Pat. No. D601,853, issued to Tzilvelis teaches an "ornamental design for a foldable food serving tray, as shown and described" that includes two round portions folded on top of a single rectangular portion.

However, these solutions still do not solve all of the problems associated with serving trays. Thus, it is desirable to solve some of the problems associated with serving trays.

SUMMARY OF THE INVENTION

In accordance with preferred embodiments of the present invention, some of the problems associated with serving trays are overcome. A personal foldable serving tray apparatus is presented.

A personal foldable serving tray apparatus that is foldable/un-foldable. In a closed, folded configuration, the foldable serving tray comprises a specific size and shape to fit into a pocket of a serving coat, vest, or apron of waiter, waitress, bartender or other servers. In an open, unfolded configuration, the personal foldable serving tray is used as a flat surface to serve food or drinks. The personal foldable serving tray apparatus includes a wireless electronic location component that allows physical location of the apparatus to be tracked within a physical space such as a restaurant, bar, etc. and displayed on a map and can also be used to measure productivity of waiters using the apparatus and accept secure wireless electronic payments from customers directly on the apparatus.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 3 is a block diagram illustrating additional details of the components of the personal foldable serving tray apparatus;

FIG. 6 is a block diagram illustrating the personal foldable serving tray apparatus in an open, unfolded and closed, folded configuration placed inside a pocket of a waiter's serving jacket and a waiter's serving vest.

DETAILED DESCRIPTION OF PREFERRED EMBODIMENTS

Exemplary Personal Foldable Serving Tray Apparatus

Figure 1:
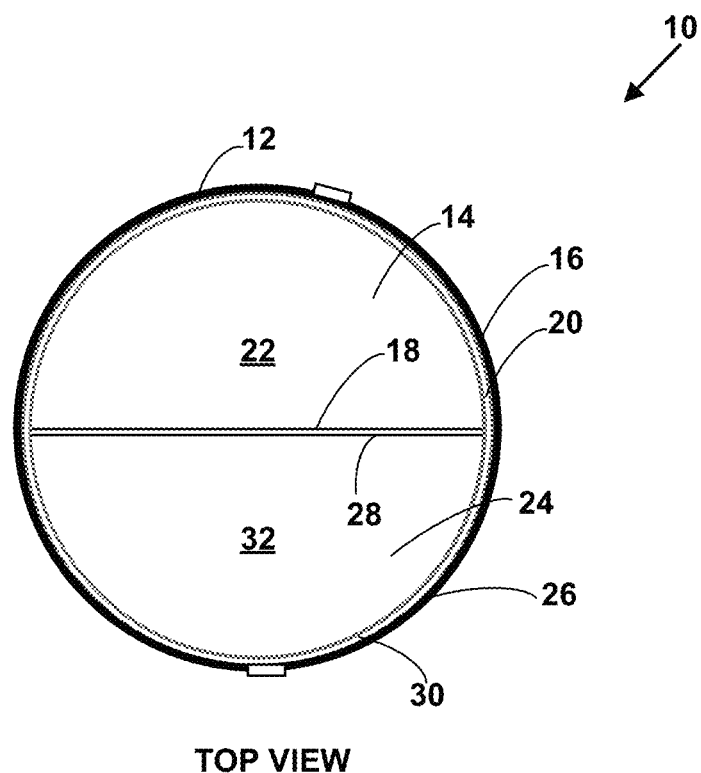
FIG. 1 is a block diagram illustrating a top view of a personal foldable serving tray apparatus in an open, unfolded position.

FIG. 1 is a block diagram illustrating a top view 10 of a personal foldable serving tray apparatus 12. FIG. 1 illustrates the personal foldable serving tray apparatus 12 in an open, unfolded configuration.

In one embodiment, the personal foldable serving tray apparatus 12 comprises wood, metal, ceramic plastic and/or composite materials and/or a combination thereof.

In one embodiment, all components and portions of the apparatus 12 are created from a same material. In another embodiment, all selected components and portions of the apparatus 12 are created with a combination of plural different materials.

In one embodiment, all components and portions of the apparatus 12 are created from wood. The wood is treated with a water-resistant coating.

In one embodiment, all components and portions of the apparatus 12 are created from metal. The metals include, but are not limited to, steel, stainless steel, aluminum, copper, brass, iron, a combination thereof, and/or other metals.

In one embodiment, the apparatus 12 comprises a ceramic cast and includes zirconium dioxide ($ZrO_2$; also known as zirconia) ceramic and/or other types of ceramics. A ceramic apparatus 12 will not corrode in restaurant environments, are non-magnetic, does not conduct electricity and is resistant to strong acid and caustic substances. However, the present invention is not limited to such an embodiment and other embodiments can also be used to practice the invention.

In one embodiment, all components and portions of the apparatus 12 are created from Polyetherimide, Polyimide other thermosetting polyimides, Polyvinyl chloride (PVC) polyethylene and/or polypropylene other plastics and/or composite materials. However, the present invention is not limited to these materials and other materials can be used to practice the invention.

"Polyetherimide" (PEI) is an amorphous, amber-to-transparent thermoplastic with characteristics similar to the related plastic PEEK. Polyether ether ketone (PEEK) is a colorless organic polymer thermoplastic Relative to PEEK, PEI is cheaper, but less temperature-resistant and lower in impact strength.

For example, commercially, ULTEM is a family of PEI products manufactured by SABIC. ULTEM resins are used in medical and chemical instrumentation due to their heat resistance, solvent resistance and flame resistance.

"Polyimide" (PI) is a polymer of imide monomers. Such imide monomers include pyromellitic dianhydride and 4,4'-oxydianiline and others. Polyimide materials are lightweight, flexible, resistant to heat and chemicals. Polyimide parts are not affected by commonly used solvents and oils, including hydrocarbons, esters, ethers, alcohols and freons. They also resist weak acids.

"Thermosetting polyimides" are known for thermal stability, good chemical resistance, excellent mechanical properties. Normal operating temperatures for such polyimides range from cryogenic with temperatures below about −238° F. (−150° C.) to those exceeding about 500° F. (260° C.).

"Composite materials" are engineered or naturally occurring materials made from two or more constituent materials with significantly different physical or chemical properties which remain separate and distinct at the macroscopic or microscopic scale within the finished structure. Common polymer-based composite materials, include at least two parts, a substrate (e.g., fibers, etc.) and a resin.

The composite materials include "Fiber-reinforced polymers" (FRP) including thermoplastic composites, short fiber thermoplastics, long fiber thermoplastics or long fiber-reinforced thermoplastics. There are numerous thermoset composites, but advanced systems usually incorporate aramid fiber and carbon fiber in an epoxy resin matrix. The composite materials also include carbon/carbon composite materials with carbon fibers and a silicon carbide matrix.

The apparatus 12 may be injection molded, extruded, pultruded, pull-winded, cast, and/or manufactured (i.e., produced using one or more machines, etc.) and/or produced with other techniques.

"Extrusion" is a manufacturing process where a material is pushed through a die to create long objects of a fixed cross-section. Hollow sections are usually extruded by placing a pin or mandrel in the die. Extrusion may be continuous (e.g., producing indefinitely long material) or semi-continuous (e.g., repeatedly producing many shorter pieces). Some extruded materials are hot drawn and others may be cold drawn.

Feedstock for extrusion may be forced through the die by various methods: by an auger, which can be single or twin screw, powered by an electric motor; by a ram, driven by hydraulic pressure, oil pressure or in other specialized processes such as rollers inside a perforated drum for the production of many simultaneous streams of material.

"Pultrusion" is a continuous process for manufacture of materials with a constant cross-section. Reinforced fibers are pulled through a resin, possibly followed by a separate preforming system, and into a heated die, where the resin undergoes polymerization. Pultrusion is not limited to thermosetting polymers or polyimides. More recently, pultrusion has been successfully used with thermoplastic matrices such either by powder impregnation of fibers or by surrounding it with sheet material of a thermoplastic/polyimide matrix, which is then heated.

In one embodiment, components of the apparatus 12 are produced with an overwrapping transverse winding process that combines continuous filament winding with a pultrusion manufacturing process to produce a pultruded pullwound hollow cylindrical structure with the shape of hollow cylindrical structure that is used for components in apparatus 12.

The "pullwinding" process incorporates plural longitudinal reinforcement fibers with plural helical-wound (e.g., hoop, etc.) layers, providing maximum torsional properties and hoop strength. A self-contained inline winding unit is used with a pultrusion machine for feeding angled fibers between layers of unidirectional fibers before curing in a pultrusion die. The plural longitudinal re-enforcement fibers are used for axial and bending resistance while the plural helical-wound fibers are used for hoop tension and compression resistance. The pullwinding equipment is comprised of twin winding heads which revolve in opposite directions over a spindle. However, the present invention is not limited to such an embodiment and other embodiments can also be used to practice the invention.

In one embodiment, the personal foldable serving tray apparatus 12 is 3D printed. A 3D printer includes 3D printing or "Additive manufacturing." 3D printing is a process of making a three-dimensional solid object of virtually any shape from a digital model. 3D printing is typically achieved using an "additive process," where successive layers of material are laid down in different shapes. 3D printing is also considered distinct from traditional machining techniques, which mostly rely on the removal of material by methods such as cutting or drilling and are "subtractive" processes.

However, the present invention is not limited to these materials and techniques more, fewer and/or other materials and/or other techniques and/or other combinations thereof, can be used to practice the invention.

The personal foldable serving tray apparatus 12 includes a first tray component 14 that comprises a first curved edge portion 16 and a first straight edge portion 18. The first tray component 14 is connected with one or more first hinged components 50, 50a to a second tray component 24 comprising a second curved edge portion 26 and a second straight edge portion 28 with one or more second hinged components 52, 52a.

The first tray component 14 and the second tray component 24 comprise a specific size and shape for fitting into a pocket of a serving clothing garment (e.g., serving coat 82, serving vest 87, serving apron 90, etc.), used by a waiter, when in a closed, folded configuration (FIG. 4) and for providing a flat serving surface when in an open, unfolded configuration (FIGS. 1 and 2).

The first tray component further comprising a first raised rim portion component 20 on a first top surface 22 of the first curved edge portion 16 extending upward therefrom to a pre-determined height and width (e.g., about 3 inches or about 7.62 centimeters, etc.) to prevent items from sliding off the first top surface 22 of the first tray component 14.

The second tray component 24 further comprising a second raised rim portion 30 component on a second top surface 32 of the second curved edge portion 26 extending upward therefrom to the pre-determined height and width, to prevent items from sliding off the top surface of the second tray component 24.

In FIG. 1, the first straight edge portion 18 and the second straight edge portion 28 are illustrated with a space between the two portions 18, 28 to further and more easily illustrate features of the invention. However, when the personal foldable serving tray apparatus 12 is in the open configuration, the two straight portions 18, 28 are physically aligned to touch each other with no space between them.

In one embodiment, the first raised rim component 20 and second raised rim component 30 are detachable from, and re-attachable to, the first tray component 14 and the second tray component 24.

In another embodiment, the first raised rim component 20 and the second raised rim component 30 are permanently attached to the first top surface 22 and the second top surface 32 and created during manufacture of personal foldable serving tray apparatus 12.

In one embodiment, the first raised rim component 20 and the second raised rim component 30 comprise an ornamental raised rim component to make the personal foldable serving tray apparatus 12 visually appealing.

In one embodiment, first raised rim component 20 and the second raised rim component 30 comprise a material the same as the first top surface 22 and the second top surface 32. In another embodiment, the, first raised rim component 20 and the second raised rim component 30 comprise a material different the first top surface 22 and the second top surface 32. In yet another embodiment, the first raised rim component 20 and the second raised rim component 30 comprise a material with a color different than the first top surface 22 and the second top surface 32. However, the present invention is not limited to these embodiments and more, different and other configurations of materials and/or colors can be used to practice the invention.

Figure 2A:
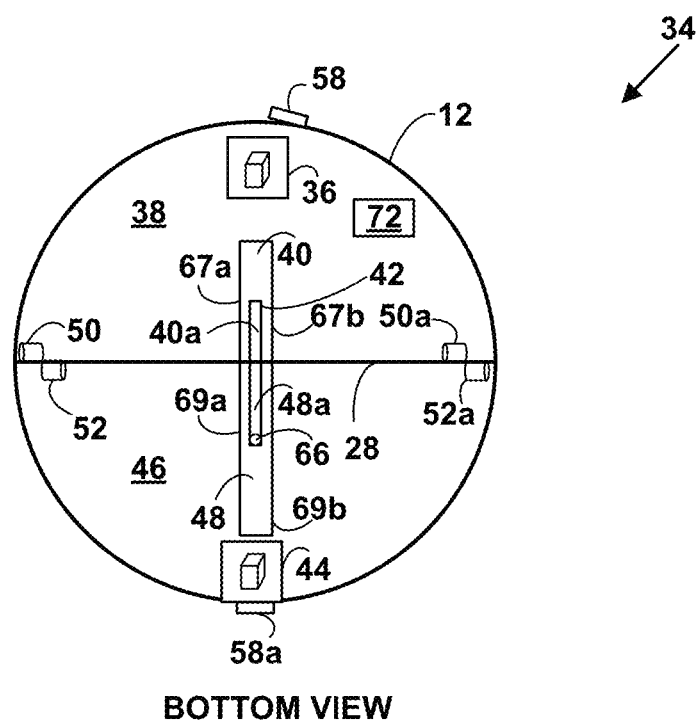
FIG. 2A is a block diagram illustrating a bottom view of the personal foldable serving tray apparatus in an open, unfolded configuration.

FIG. 2A is a block diagram of a bottom view 34 of the personal foldable serving tray apparatus 12. FIG. 2 also illustrates the personal foldable serving tray apparatus 12 in an open, unfolded configuration.

Figure 2B:
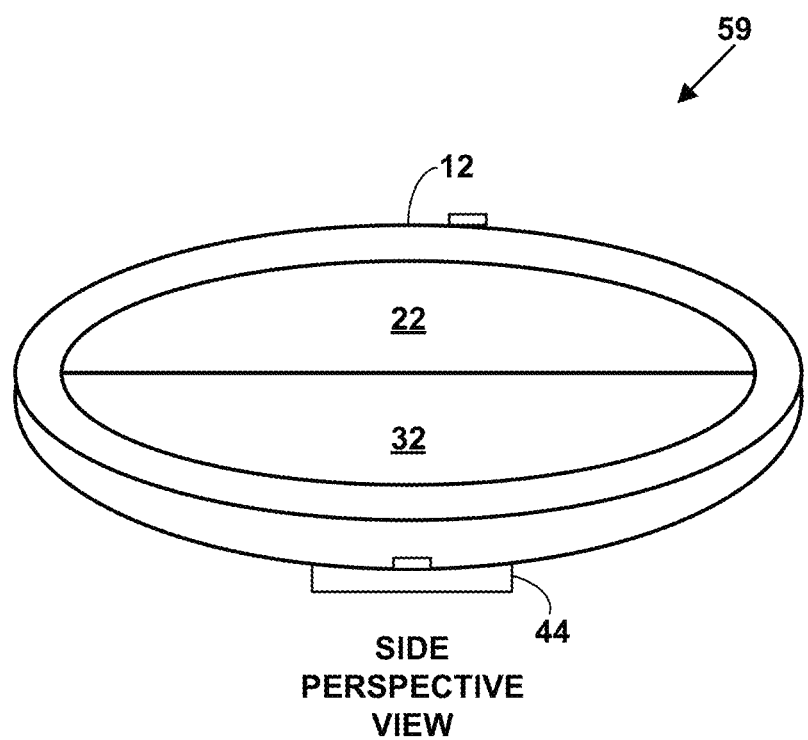
FIG. 2B is a block diagram illustrating a side perspective view of the personal foldable serving tray apparatus in an open, unfolded configuration.

FIG. 2B is a block diagram illustrating a side perspective view 59 of the personal foldable serving tray apparatus in an open, unfolded configuration.

The first tray component 14 further comprising a first handle component 36 on a first bottom surface 38 of the first tray component 14. The first handle component 36 allows the apparatus 12 to be grasped from a first bottom surface 38 of the apparatus 12. The first handle component 36 extends downward from the first bottom surface 38 another pre-determined distance (about 2 inches, or about 5 centimeters, etc.) and provides a first tray stand portion for the apparatus 12 when the apparatus is placed on a flat surface, thereby elevating the apparatus above the flat surface. The another pre-determined distance allows the first handle component 36 to fit within the apparatus 12, when the apparatus 12 is in the closed, folded configuration.

The first tray component 14 further comprises a first channel component portion 40 on the first bottom surface 38 of the first tray component 14, the first channel component 40 including first grooved channels 67a and 67b on opposite sides of the first channel component 40 for accepting a first portion of a sliding component 42 to securely lock the first tray component 14 to the second tray component 24 in the open, unfolded configuration (FIGS. 1 and 2) and preventing folding of the apparatus 12 when the apparatus 12 is in the open, unfolded configuration (FIGS. 1 and 2).

The first tray component 14 further comprises two or more first hinged components 50 50a. A first portion of the two or more first hinged components 50, 50a is connected to a first area on the first straight edge portion 18 of the first tray component 14 and a second portion of the two or more first hinged components 50, 50a, connected to a second area on the second straight edge portion 28 of the second tray component 24, the two or more first hinged components 50, 50a allowing the first tray component 14 to be folded on top of the second tray component 24 or visa-versa, when the apparatus 12 is in the closed, folded configuration (FIG. 4).

In this embodiment, the first area and the second area do not include the whole surface of the first straight edge portion 18 and the second straight edge portion 28, but only a small area thereon large enough to attached the hinged components 50, 50*a*, 52, 52*a*. However, the present invention is not limited to these embodiments and other embodiments can be used to practice the invention.

Figure 4:
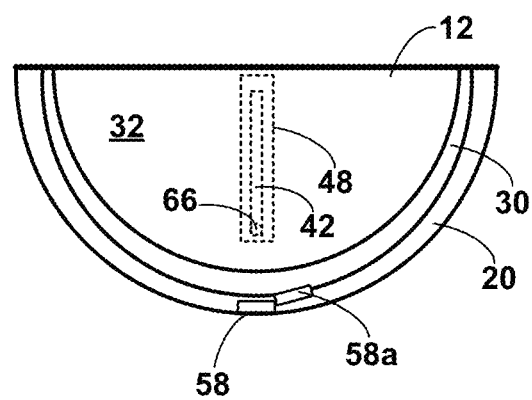
FIG. 4 is a block diagram illustrating a top view of the personal foldable serving tray apparatus in a closed, folded configuration.

The first tray component 14 further comprises a first grasping component 58 attached to the first curved edge portion 16 of the first tray component 14 and extending outward therefrom a pre-determined distance (e.g., about 3 inches, or about 7.62 centimeters, etc.), allowing easy grasping and lifting of the first tray component 14 from the second tray component 24 when the apparatus 12 is in the closed, folded configuration (FIG. 4).

The second tray component 24 further comprises a second handle component 44 on a second bottom surface 46 of the second tray component 24. The second handle component 44 allows the apparatus 12 to also be grasped from the second bottom surface 46 of the apparatus 12. The second handle component 44 also extends downward from the second bottom surface 46 the another pre-determined distance and providing a second tray stand portion for the apparatus 12 when the apparatus 12 is placed on the flat surface, thereby elevating the apparatus 12 above the flat surface. The another pre-determined distance (e.g., about 2 inches, or about 5 centimeters, etc.) allows the second handle component 44 to fit within the apparatus 12, when the apparatus 12 is in the closed, folded configuration.

The second tray component 24 further comprises a second channel component portion 48 on the second bottom surface 46 of the second tray component 24. The second channel component 24 includes second grooved channels 69*a*, 69*b* on opposite sides of the second channel component 48 for accepting a second portion of the sliding component 42 to securely lock the second tray component 24 to the first tray component 14 in the open, unfolded configuration (FIGS. 1 and 2) and preventing folding of the apparatus 12 when the apparatus is in the open, unfolded configuration (FIGS. 1 and 2).

The second channel component portion 48 providing storage of the sliding component 42 within the second bottom surface 46 of the second tray component 24 when the apparatus 12 is in the closed, folded configuration (FIG. 4).

The second tray component further comprising two or more second hinged components 52, 52*a*, a first portion of the two or more second hinged components 52, 52*a* connected to the second straight edge portion 28 of the second tray component 24 and the first portion of the two or more second hinged components 52, 52*a* connected to the first straight edge portion 18 of the first tray component 14, the two or more second hinged components 52, 52*a* also allowing the second tray component 24 to be folded on top of the first tray component 14, or visa-versa, when the apparatus 12 is in the closed, folded configuration (FIG. 4).

The second tray component 24 further comprising a second grasping component 58*a* attached to the second curved edge portion 26 of the second tray component 24 and extending outward therefrom the predetermined distance, allowing grasping and lifting of the second tray component 24 from the first tray component 14 when the apparatus 12 is in the closed, folded configuration (FIG. 4).

Sliding component 42 is illustrated in FIG. 2 without touching channel grooves 67*a*, 67*b* of the first channel component portion 40 and channels grooves 69*a* and 69*b* of the second channel component portion 48 to more clearly illustrate features of the invention. FIG. 3 illustrates a side-end view of the channel grooves in the channel components.

FIG. 3 is a block diagram 60 illustrating additional details of the components of the personal foldable serving tray apparatus 12.

In one embodiment, the plural hinged components 50, 52 are added to the first tray component 14 and second tray component 24 during a manufacturing process and are components integral to the first tray component 14 and second tray component 24. In another embodiment, the plural hinged components 50, 52 are added to the first tray component 14 and second tray component 24 after a manufacturing process used to create the first tray component 14 and the second tray component 24. In such an embodiment, the plural hinged components 50, 52 on the first straight edge portion 18 are connected to the second portions of the plural hinged components 50*a*, 52*a* on the second edge portion 28 with plural attachment means 62, 62*a*. The attachments means, include, but are not limited to, nails, pins, screws, bolts, rivets, adhesive, etc. However, the present invention is not limited to this embodiment and more, fewer or other types of hinged components and/or attachment means can be used to practice the invention.

However, if an adhesive is used, the plural hinged components 50, 52 may not be removable once attached. However, the present invention is not limited to this embodiment and more, fewer or other types of hinged components and attachments means for the hinged components can be used to practice the invention.

In another embodiment, the plural hinged component 50, 52 are replaced with a single plural hinged component 64 comprising and connecting a full length of the first straight edge portion 18 of the first tray component 14 and the second straight edge portion 28 of the second tray component 24. However, the present invention is not limited to this embodiment and more, fewer or other types of hinged components can be used to practice the invention.

The sliding component 42 is a flat component with a rectangular shape that includes a circular opening 66 to allow a user easily insert one or more fingers to slide the sliding component 42 from the second channel component portion 48 on the second bottom surface 46 of the second tray component 24 into the first channel component portion 40 on the first bottom surface 38 of the first tray component 14 across the first straight edge portion 18 for the first tray component 14 and the second straight edge portion 28 of the second tray component 24, thereby locking the apparatus in an open and/or unfolded configuration.

In one embodiment, the sliding component 42 is stored completely within the second channel component portion 48 on the second bottom surface 46 of the second tray component 24 when the apparatus 12 is in a closed, folded configuration illustrated by the dashed lines FIG. 4.

In another embodiment, the sliding component 42 is stored completely within the first channel component portion 40 on the first bottom surface 38 of the first tray component 14 when the apparatus 12 is in a closed, folded configuration.

However, the present invention is not limited to these embodiments and more, fewer or other types of embodiments and slider storage configurations can be used to practice the invention.

The sliding component 42 comprises a flat rectangular component of a pre-determined width and thickness to fit within the first grooved channels 67*a*, 67*b* of the first channel component 40 on the first bottom surface 38 of the first tray component 14 and the second grooved channels 69a, 69b of the second channel component 48 on the second bottom surface 46 of the second tray component 24.

The sliding component 42 is moveable forwards and backwards within the first grooved channels 67a, 67b of the first channel component 40 on the first bottom surface 38 of the first tray component 14 and the second grooved channels 69a, 69b of the second channel component 48 on the second bottom surface 46 of the second tray component 24 and preventing folding of the apparatus 12 when the first portion 40a of the sliding component 42 is within first channel component 40 on the first bottom surface 38 of the first tray component 14 and the second portion 48a of the sliding component 42 is within the second grooved channels 69a, 69b of the second channel component 48 on the second bottom surface 46 of the second tray component 24 and the apparatus 12 is in the open, unfolded configuration (FIGS. 1 and 2).

The sliding component 42 further includes a circular opening 66 on one end portion of the sliding component 42 for grasping and sliding the sliding component forwards and backwards within the first channel component 40 on first bottom surface 38 of the first tray component 14 and the second channel component 48 on the second bottom surface 46 of the second channel component 24 to lock the apparatus 12 in the open, unfolded configuration (FIGS. 1 and 2) and unlock the apparatus 12 for storing in the closed, folded configuration (FIG. 4).

FIG. 4 is a block diagram 68 illustrating a top view of the personal foldable serving tray apparatus 12 in a closed, folded configuration.

Figure 5:
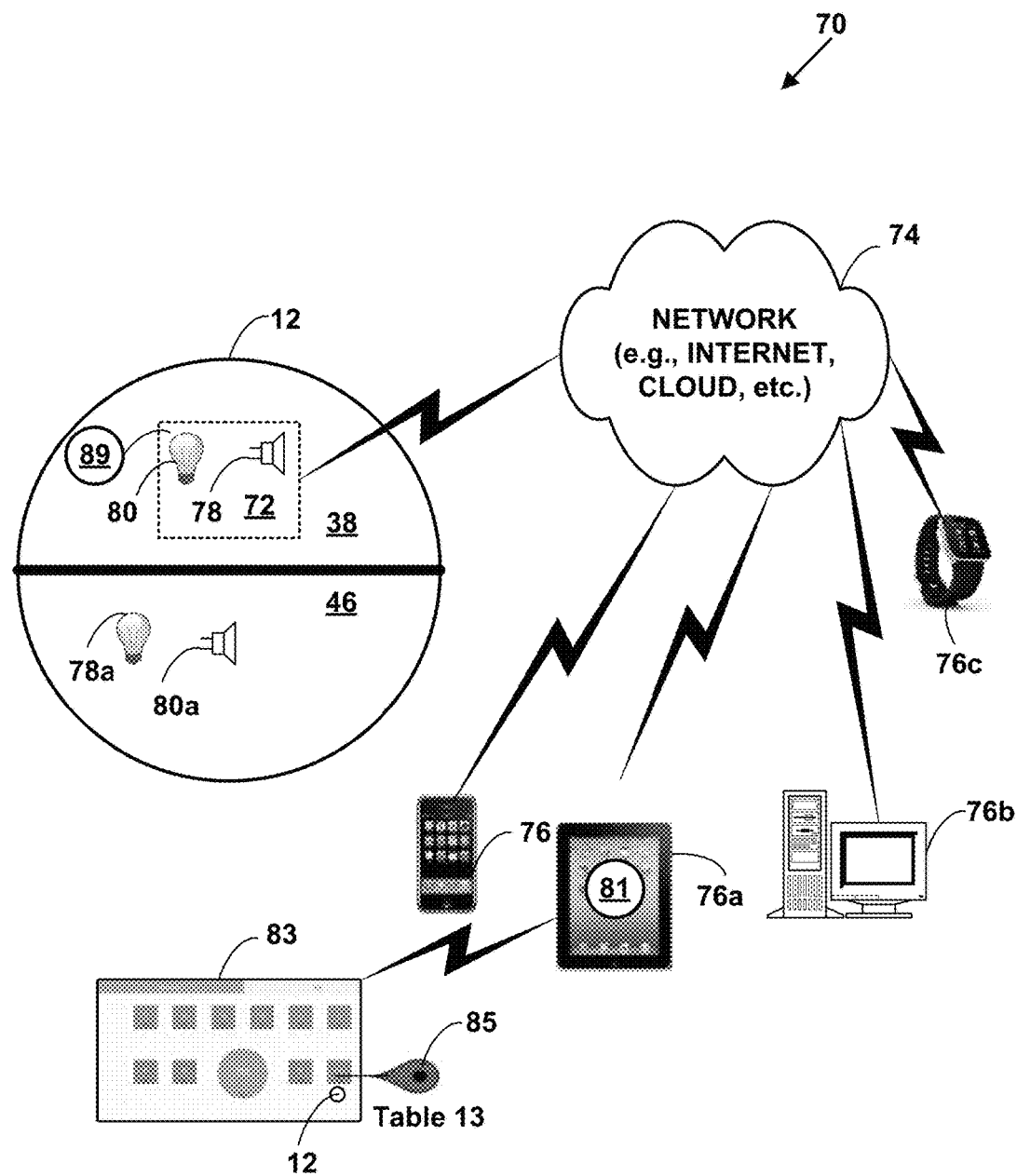
FIG. 5 is a block diagram illustrating an additional electronic components used with the personal foldable serving tray apparatus.

FIG. 5 is a block diagram 70 illustrating an additional electronic components used with the personal foldable serving tray apparatus 12.

The apparatus 12 further includes an electronic location component 72 with one or more processors, a non-transitory computer readable medium and one or more applications 89 stored in the non-transitory computer readable medium. An operating environment for the electronic location component 72 includes a processing system with one or more high speed Central Processing Unit(s) ("CPU") or other types of processors and a non-transitory memory. The present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory ("RAM")) or non-volatile (e.g., Read-Only Memory ("ROM")) mass storage system readable by the CPU. In one embodiment, the data bits are stored with one or more encryption and/or security methods.

The electronic location component 72 is attached to a bottom surface 38, 46 of the apparatus 12 so it does not interfere with food and/or drinks placed on the top surface of the apparatus 12. The electronic location component 72 includes a wireless component that allows a physical location of the apparatus 12 to be tracked via a wireless communications network 74 (e.g., LAN, WAN, Internet, Cloud, Mesh, etc.) by another network device 76 with one or more processors (e.g., mobile phone 76, tablet 76a, server network device 76b, wearable network device 76c (smart watch, smart jewelry, etc.), etc. within a physical space such as a restaurant, bar, banquet hall, etc. The electronic location component 72 is used to determine a physical location of the apparatus 12 within the physical space and thus, a physical location of a waiter using the apparatus 12 within the physical space.

In one embodiment, the location component 72 includes a near field communications (NFC), machine-to-machine (M2M) communications, Bluetooth Infra data association (IrDA), Industrial, Scientific and Medical (ISM), IEEE 802.11a, 802.11ac, 802.11b, 802.11g, 802.11n, Wireless Fidelity (Wi-Fi), Wi-Fi Aware, cellular telephone, or Radio Frequency Identifier (RFID) and a Global Positioning System (GPS), wireless component.

In one embodiment, the location component 72 includes wireless location components with one or more processors and one or more receivers and/or one or more transceivers for sending and/or receiving wireless signals. However, present invention is not limited to location component 72 described and more, fewer or other types of location components can be used to practice the invention.

In one embodiment, the location component 72 sends location information to an application 81 (FIG. 5) on a network device 76 which places a location of plural apparatus 12 on a map 83 for the physical space (e.g., restaurant, bar, etc.) to allow a user to visually determine a physical location 85 (only one of which is illustrated) of the plural apparatus 12 in the physical space and thus, a physical location of a waiter using the apparatus 12 in the physical space (e.g., Table 13 on map 83, etc.)

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as a meal purchase, etc.), which is relayed through a network (wireless, cloud, etc.) to an application (e.g., software program, etc.) on another network device 76, that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

Bluetooth (IEEE 802.15.1a) is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. and the IEEE 802.15.1a standard are incorporated herein by reference.

Infra-data association (IrDA) is a short-range radio wireless Bluetooth or other wireless infrared communications.

Industrial, Scientific and Medical (ISM) are short-range radio wireless communications interfaces operating at 400 MHz, 800 MHz, and 900 Mhz. ISM sensors may be used to provide wireless information to practice the invention.

802.11b defines a short-range wireless network interface. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11an, 802.11b, 802.11g and 802.11n standards are incorporated herein by reference.

Wi-Fi is another type of 802.11xx interface, whether 802.11b, 802.11a, dual-band, etc. Wi-Fi devices include an RF interfaces such as 2.4 GHz for 802.11b or 802.11g and 5 GHz for 802.11a.

Wi-Fi Aware is a new capability for energy-efficient, proximity-based service discovery among Wi-Fi capable devices. The technology in Wi-Fi Aware enables apparatus 12 to discover other devices such network devices 76, applications, and information nearby before making a Wi-Fi connection. Wi-Fi Aware makes contextual awareness more immediate and useful, enabling personalized applications that continuously scan surroundings, anticipate actions, and notify of services and selected preferences.

Cellular telephone technology uses radio waves over a networked area called cells and is served through a cell site or base station at a fixed location, enabling calls to be made and data to transmitted wirelessly over a wide range.

An RFID component is an automatic identification method, relying on storing and remotely retrieving data using devices called RFID tags or transponders. An RFID tag is a small object that can be attached to or incorporated into a product, animal, or person. RFID tags contain antennas to enable them to receive and respond to radio-frequency queries from an RFID transceiver. Passive tags require no internal power source, whereas active tags require a power source. RFID sensors and/or RFID tags are used to provide wireless information to practice the invention.

Passive tags are powered by received radiation from a reading device and require no internal source of power; thus, they can be manufactured at very low cost and require no ongoing maintenance as long as they are not removed or physically damaged. Passive tags can only be read by a reader device in close proximity to the tag, which is an advantage in RFID-based in-building location services.

RFID Passive tags can be manufactured in a sticker-like form factor and held in place by adhesive, providing very low installation cost; however, such an arrangement is not heat-resistant, and conventional mechanical mounting employing screws or cover plates is advisable for at least a minimal subset of all installed tags.

RFID Passive tags are typically capable of providing a 96-bit number to a tag reader: 96 bits allow $2^{96}=10^{29}$ (100 billion, billion, billion) possible codes, ample to allow unique identification of every significant location within a building.

RFID active tags are employed for location awareness. Active tags have longer range and can include more sophisticated functionality. In the context of this invention, active tags may be programmed to validate their location from time to time, either by reference to Global Positioning System (GPS) signals using very long integration times, or by interrogation of other RFID tags in their vicinity.

RFID Active tags are also deployed in a mesh network that would allow information to pass from tag to tag. This type of network would allow tag and reader information to be passed from location to location and possibly from floor to floor to move the information to a central location or to the building wall ultimately making it easier to access. Active tag networks have significant functional advantages, but are relatively expensive and maintenance-intensive compared to passive tags.

However, the present invention is not limited to the wireless components described and more, fewer or other types of wireless components can be used to practice the invention.

The Global Positioning System (GPS) is a space-based global navigation satellite system (GNSS) that provides reliable location and time information in all weather and at all times and anywhere on or near the Earth. A GPS receiver calculates its position by precisely timing signals sent by GPS satellites. A GPS receiver uses the messages it receives to determine a transit time of each message and computes a distance to each GPS satellite. These distances along with the satellites' locations are used with the possible aid of triangulation, depending on which algorithm is used, to compute a current physical position of the GPS receiver. Many GPS units also show derived information such as travel direction and speed, calculated from position changes. The GPS coordinates include standard GPS, GPS map, Digital GPS (DGPS) and/or other types of GPS information.

In some indoor environments, GPS is not available and other methods and devices are used to obtain location information for the apparatus 12. In such indoor environments, NFC, M2M, RFID, WiFi, WiFi Aware, cell tower and/or other types of location tracking methods such as cellular telephone triangulation can also be used.

For example, electronic location component 72 seeks Wi-Fi access points at and/or near a physical location and sends its Wi-Fi address along with its location identified to other network devices 76 via a wireless communication network. A physical location of the apparatus 12 is determined knowing the strength of Wi-Fi signals it generates as it moves about the physical location.

As another example, cell tower triangulation is another technique widely used to identify the location of the apparatus 12 with cellular telephone technology including in the electronic location component. A cell phone signal may be picked up by three or more cell towers enabling the triangulation to work. So when a triangulation happens, with the point of overlap of three signals, it is possible to estimate the location of the apparatus 12 based on its distance from the three cell towers. The cell towers broadcast their location and by knowing the distance of the apparatus 12 from each towers, the co-ordinates of the apparatus 12 is calculated.

The electronic location component 72 further includes a payment application 89 that allows a wireless electronic payment to be securely (i.e., with a pre-determined encryption and/or security method, etc.) accepted on the apparatus 12. In such an embodiment, the apparatus 12 can securely accept electronic payments directly from a customer without a waiter having to carry any cash.

In one embodiment, the payment application 89 includes an application accepting VENMO, XOOM, ZELLE, APPPLE PAY, GOOGLE PAY, SAMSUNG PAY, etc. However, the present invention is not limited to such an embodiment and more, fewer and other types of electronic payments may be used to practice the invention.

In one embodiment, the electronic location component 72 further includes an audio component 78. In another embodiment, the apparatus 12 further includes a standalone audio component 78a. The audio component 78 includes a bell, buzzer, speaker and/or other type of audio component 78 to receives audio information on the apparatus 12 as a signal to the user of the apparatus 12 (e.g., "a customer's order is ready, please go to table 11," etc.). However, present invention is not limited to audio components 78 described and more, fewer or other audio components can be used to practice the invention.

In one embodiment, the electronic location component 72 further includes a visual component 80. In another embodiment, the apparatus 12 further includes a standalone video component 80a. The visual component 80 includes, but is not limited to, a lighting component, including but not limited to, one or more light bulbs, one or more light emitting diodes (LEDs), and/or other type of lighting component and/or a display component, including but not limited to, a liquid crystal display (LCD) component. The visual component 80 receives visual information on the apparatus 12 for a user (e.g., a customer's order is ready, please go to table 17, please return to the kitchen or bar, then go to table 29 to take an order, etc.). However, present invention is not limited to visual components 76 described and more, fewer or other visual components can be used to practice the invention.

In one embodiment, the electronic location component 72 is included inside one of the handles 36, 44. In another embodiment, the electronic location component 72 is a separate component attached to bottom surface 38, 46 of the apparatus 12 and not included inside one of the handles 36, 44.

The electronic location component 72 is also be used to track the productivity of server using the apparatus 12 with plural productivity factors. For example, the electronic location component 72 can be used to track how long it takes a server to reach a guest with food and/or drinks, how long it takes a server to return to a wait station, kitchen, bar, how many customers were served with the apparatus 12, how many tables were served with the apparatus 12, etc.

For example, if a measure of productivity is defined as "customers served per hour," the emphasis is on speed and throughput, and the waiters will try to complete each of their transactions as quickly as possible. However, if a measure of productivity is defined as a "number of dollars of food served per customer," such a productivity measure would lead to totally different behaviors. The waiters in the second example would suggest more expensive items and would encourage the customers to order more appetizers, wine, and dessert, regardless of the time taken to serve them. In this case, time is not a factor; the quick turnover of customers would be a disadvantage. Other possible productivity measures could each lead to a different set of behaviors and methods to track the waiters. One way to view and measure individual productivity is to consider how the efforts of an individual contribute to the productivity or success of the organization. However, the present invention is not limited to the productivity methods described, and more, fewer and other types of productivity measures can be used to practice the invention.

FIG. 6 is a block diagram 82 illustrating the personal foldable serving tray apparatus 12 in a closed, folded configuration (e.g. FIG. 4) placed inside a waiter's service jacket 84 within a pocket 86 of the waiter's jacket 84.

Figure 7:
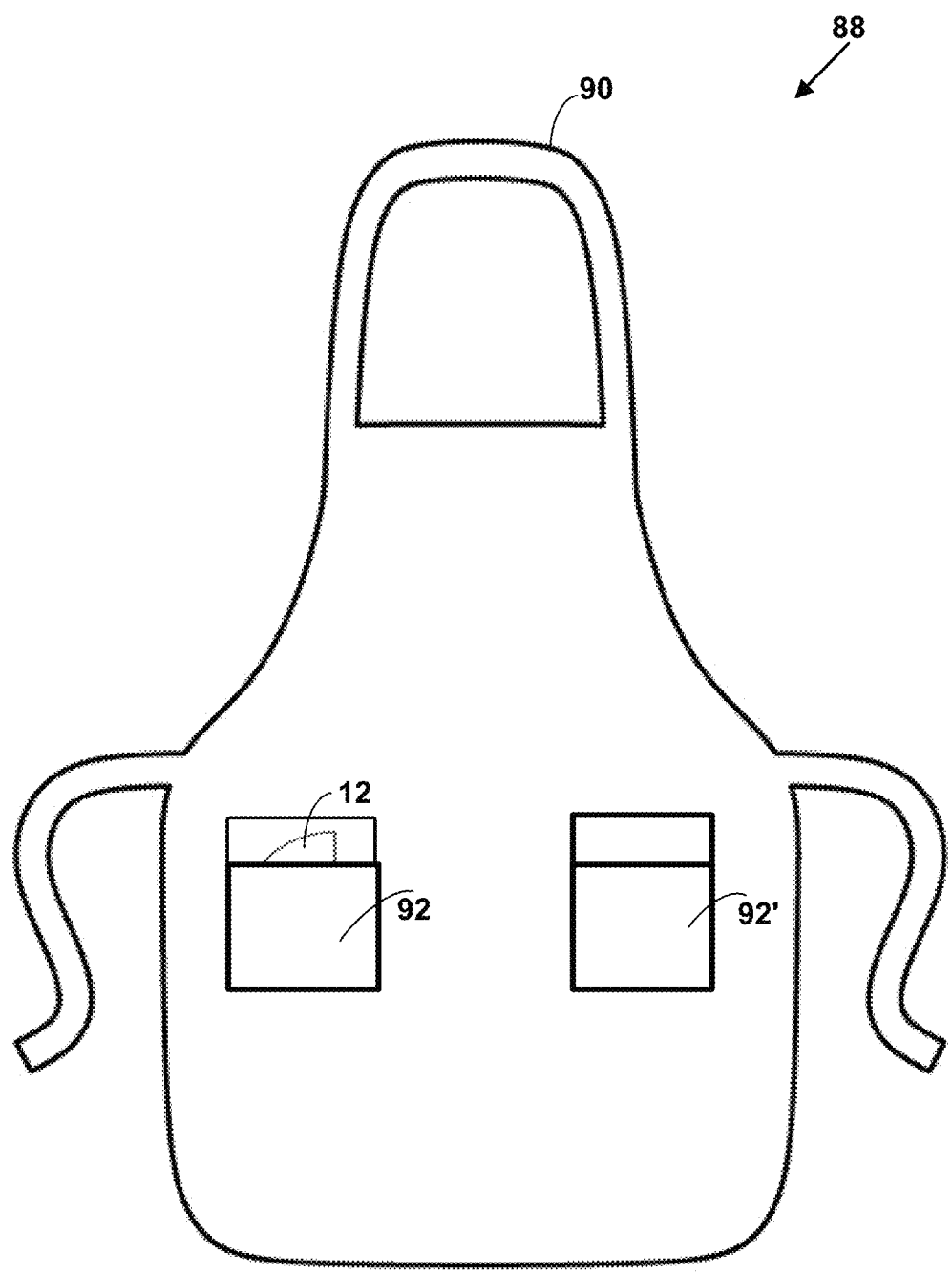
FIG. 7 is a block diagram illustrating the personal foldable serving tray apparatus in a closed or folded configuration placed inside a pocket of a waiter's serving apron.

FIG. 7 is a block diagram 88 illustrating the personal foldable serving tray apparatus 12 in a closed, folded configuration (e.g. FIG. 4) placed inside a serving apron 90, within a pocket 92, 92' of the serving apron 90. In FIG. 7 the serving apron 90 is illustrated with two pockets 92, 92' and includes an apron with an over the neck configuration. However, the present invention is not limited to such and embodiment and more or fewer pockets can be used and other apron configurations such as around-the-waist aprons, etc. can be used to practice the invention.

Apparatus 12 is illustrated as a circular shape. However, the present invention is not limited to a circular shape, and other shapes, (e.g., oval, square, rectangular, diamond, trapezoid, parallelogram, etc.) can be used to practice the invention and provided the personal foldable serving tray apparatus 12.

In one specific embodiment, the apparatus 12 includes a circular shape with a diameter of about ten inches (about 25.4 centimeters, etc.) when in the unfolded, open configuration that allows the apparatus 12 to be placed in a pocket of user's server jacket vest and/or apron that is about five inches (about 12.7 centimeters, etc.) wide when the apparatus 12 is in the folded, closed configuration 68. In another specific embodiment, the apparatus includes an oval shape with a first diameter of about ten inches (about 25.40 centimeters, etc.) along a first axis and a second diameter of about nine inches (about 22.86 centimeters, etc.) along a second axis. It has been determined experimentally that the apparatus 12 with the size and shape configurations described can support a weight of about 10-12 pounds or about 4-5 kilograms on its flat serving surface with the apparatus is in the open, unfolded configuration. However, the present invention is not limited to these dimensions and shapes and/or other dimensions and/or other shapes with different dimensions can also be used to practice the invention.

It should be understood that the architecture, programs, processes, methods and systems described herein are not related or limited to any particular type of components, materials and/or systems, unless indicated otherwise. Various types of general purpose or specialized components, materials and systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer and/or other types elements may be used in the block diagrams.

While various elements of the preferred embodiments have been described as being implemented with specific components and/or materials other implementations may alternatively be used, and vice-versa.

It should be understood that the architecture, programs, processes, methods and systems described herein are not related or limited to any particular type system, unless indicated otherwise. Various types of general purpose or specialized systems may be used with or perform operations in accordance with the teachings described herein.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and their equivalents thereto, are claimed as the invention.

I claim:

1. A personal foldable serving tray apparatus, comprising in combination:

a first tray component comprising a first curved edge portion and a first straight edge portion, the first tray component connected with one or more hinged components to a second tray component comprising a second curved edge portion and a second straight edge portion, the first tray component and the second tray component comprising a specific size and shape for fitting into a pocket of a serving clothing garment when in a closed, folded configuration and for providing a flat serving surface when in an open, unfolded configuration;

the first tray component further comprising a first raised rim portion component on a first top surface of the first curved edge portion extending upward therefrom to a pre-determined height and width, to prevent items from sliding off the first top surface of the first tray component, the first tray component further comprising a first handle component on a first bottom surface of the first tray component, the first handle component allowing the apparatus to be grasped from the first bottom surface of the apparatus, the first handle component extending downward from the first bottom surface another pre-determined distance and providing a first tray stand portion for the apparatus when the apparatus is placed on a flat surface, thereby elevating the apparatus above the flat surface, the first tray component further comprising a first channel component portion on the first bottom surface of the first tray component, the first channel component including first grooved channels on opposite sides of the first channel component for accepting a first portion of a sliding component to securely lock the first tray component to the second tray component in the open, unfolded configuration and preventing folding of the apparatus when the apparatus is in the open, unfolded configuration, the first tray component further comprising one or more first hinged components, a first portion of the one or more first hinged components connected to the first straight edge portion of the first tray component and a second portion of the one or more first hinged components connected to the second straight edge portion of the second tray component, the one or more first hinged components allowing the first tray component to be folded on top of the second tray component or visa-versa, when the apparatus is in the closed, folded configuration, and the first tray component further comprising a first grasping component attached to the first curved edge portion of the first tray component and extending outward therefrom, allowing grasping and lifting of the first tray component from the second tray component when the apparatus is in the closed, folded configuration;

the second tray component further comprising a second raised rim portion component on a second top surface of the second curved edge portion extending upward therefrom to the pre-determined height and width, to prevent items from sliding off the top surface of the second tray component, the second tray component further comprising a second handle component on a second bottom surface of the second tray component, the second handle component allowing the apparatus to be grasped from the second bottom surface of the apparatus, the second handle component extending downward from the second bottom surface the another pre-determined distance and providing a second tray stand portion for the apparatus when the apparatus is placed on the flat surface, thereby elevating the apparatus above the flat surface, the second tray component further comprising a second channel component portion on the second bottom surface of the second tray component, the second channel component including second grooved channels on opposite sides of the second channel component for accepting a second portion of the sliding component to securely lock the second tray component to the first tray component in the open, unfolded configuration and preventing folding of the apparatus when the apparatus is in the open, unfolded configuration, and the second channel component portion providing storage of the sliding component within the second bottom surface of the second tray component when the apparatus is in the closed, folded configuration;

the second tray component further comprising one or more second hinged components, a first portion of the one or more second hinged components connected to the second straight edge portion of the second tray component and the one or more second hinged components connected to the first straight edge portion of the first tray component, the one or more second hinged components allowing the second tray component to be folded on top of the first tray component or visa-versa, when the apparatus is in the closed, folded configuration, the second tray component further comprising a second grasping component attached to the second curved edge portion of the second tray component and extending outward therefrom, allowing grasping and lifting of the second tray component from the first tray component when the apparatus is in the closed, folded configuration;

the sliding component comprising a flat rectangular component of a pre-determined width and thickness to fit within the first grooved channels of the first channel component on the first bottom surface of the first tray component and the second grooved channels of the second channel component on the second bottom surface of the second tray component, the sliding component moveable forwards and backwards within the first grooved channels of the first channel component on the first bottom surface of the first tray component and the second grooved channels of the second channel component on the second bottom surface of the second tray component and preventing folding of the apparatus when the first portion of the sliding component is within first channel component on the first bottom surface of the first tray component and the second portion of the sliding component is within the second channel component on the second bottom surface of the second tray component and the apparatus is in the open, unfolded configuration, and the sliding component further including a circular opening on one end portion of the sliding component for grasping and sliding the sliding component forwards and backwards within the first channel component on first bottom surface of the first tray component and the second channel component on the second bottom surface of the second tray component, to lock the apparatus in the open, unfolded configuration and unlock the apparatus for storing in the closed, folded configuration; and an electronic location component attached to the first bottom surface or the second bottom surface of the apparatus, the electronic location component including a wireless component with one or more processors, a non-transitory computer readable medium and receivers or transceivers, allowing a physical location of the apparatus to be tracked and determined by another network device with one or more processors via a wireless communications network within a physical space.

2. The personal foldable serving tray apparatus of claim 1 wherein the first tray component and the second tray component comprise wood, metal, ceramic plastic, or composite materials or a combination thereof.

3. The personal foldable serving tray apparatus of claim 1 wherein the first raised rim portion component and second raised rim portion component comprise a material different than the first tray component and the second tray component.

4. The personal foldable serving tray apparatus of claim 1 wherein the first raised rim portion component and second raised rim portion component comprise a color different than the first tray component and the second tray component.

5. The personal foldable serving tray apparatus of claim 1 wherein components for the first tray component, the second tray component and the sliding component are produced with a three-dimensional (3D) printer.

6. The personal foldable serving tray apparatus of claim 1 wherein components for the first tray component, the second tray component and the sliding component are injection molded, extruded, pultruded, pull-winded, cast or manufactured, or a combination thereof.

7. The personal foldable serving tray apparatus of claim 1 wherein electronic location component includes a near field communications (NFC), machine-to-machine (M2M) communications, Bluetooth (IEEE 802.15.1a), Infra data association (IrDA), Industrial, Scientific and Medical (ISM), IEEE 802.11a, 802.11ac, 802.11b, 802.11g, 802.11n, Wireless Fidelity (Wi-Fi), Wi-Fi Aware, cellular telephone, Radio Frequency Identifier (RFID), or Global Positioning System (GPS) wireless component.

8. The personal foldable serving tray apparatus of claim 1 wherein the physical space is a restaurant, bar or banquet hall.

9. The personal foldable serving tray apparatus of claim 1 wherein the apparatus comprises a circular, oval, square, rectangular, diamond, trapezoid, or parallelogram, shape.

10. The personal foldable serving tray apparatus of claim 1 wherein the specific size and shape for fitting into the pocket of the serving clothing garment include circular shape with a diameter of about 10 inches or about 25 centimeters.

11. The personal foldable serving tray apparatus of claim 1 wherein the serving clothing garment includes a server jacket, server vest or server apron.

12. The personal foldable serving tray apparatus of claim 1 wherein the first raised rim component and second raised rim component are detachable from and re-attachable to, the first tray component and the second tray component.

13. The personal foldable serving tray apparatus of claim 1 wherein the electronic location component measures a productivity of use for the apparatus with a plurality of productivity factors.

14. The personal foldable serving tray apparatus of claim 13 wherein the plurality of productivity factors include measuring a first time period used to track how long it takes the personal foldable serving tray apparatus to reach a table with food or drinks, measuring a second time period it takes the personal foldable serving tray apparatus to return to a wait station, kitchen or bar, determining a first count of how many customers were served with the personal foldable serving tray apparatus and determining a second count of how many tables were served with the personal foldable serving tray apparatus.

15. The personal foldable serving tray apparatus of claim 1 wherein the electronic location component includes a Wireless Fidelity (Wi-Fi) electronic location component that electronically seeks Wi-Fi access points at the physical location and wirelessly sends a Wi-Fi address along with an identified location of the personal foldable serving tray apparatus at the physical location to other network devices via a wireless communication network.

16. The personal foldable serving tray apparatus of claim 1 wherein electronic location component is included within the first handle component on the first bottom surface of the first tray component or the second handle component the second bottom surface of the second tray component.

17. The personal foldable serving tray apparatus of claim 1 wherein the electronic location component includes a payment application for accepting secure wireless electronic payments on the apparatus.

18. The personal foldable serving tray apparatus of claim 1 further including an audio component comprising a bell, buzzer, speaker for receiving audio information on the apparatus.

19. The personal foldable serving tray apparatus of claim 1 further including a visual component comprising one or more light bulbs, one or more light emitting diodes (LEDs), or a display component, including, a liquid crystal display (LCD) component, for receiving visual information on the apparatus.

20. The personal foldable serving tray apparatus of claim 1 further including a standalone audio component for receiving audio information on the apparatus or a standalone visual component for receiving visual information to the apparatus.

* * * * *